United States Patent
Todd et al.

(10) Patent No.: US 8,379,615 B2
(45) Date of Patent: *Feb. 19, 2013

(54) POWER SAVING IN A DEVICE COMPATIBLE WITH CELLULAR AND WLAN NETWORKS

(75) Inventors: Terence Douglas Todd, Hamilton (CA); Vytautas Robertas Kezys, Hamilton (CA)

(73) Assignees: Research In Motion Limited, Waterloo, Ontario (CA); McMaster University, Hamilton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,945

(22) Filed: Oct. 22, 2010

(65) Prior Publication Data

US 2011/0034205 A1 Feb. 10, 2011

Related U.S. Application Data

(63) Continuation of application No. 11/426,977, filed on Jun. 28, 2006, now Pat. No. 7,830,844.

(51) Int. Cl.
*H04W 4/00* (2009.01)

(52) U.S. Cl. ............................................. 370/338

(58) Field of Classification Search ............ 370/338
See application file for complete search history.

(56) References Cited

U.S. PATENT DOCUMENTS

| | | | |
|---|---|---|---|
| 6,826,154 B2 | 11/2004 | Subbiah et al. | |
| 7,162,236 B2 | 1/2007 | Dorenbosch et al. | |
| 7,502,348 B2 | 3/2009 | Zhang et al. | |
| 7,613,171 B2 | 11/2009 | Zehavi et al. | |
| 2004/0033812 A1 | 2/2004 | Matsunaga et al. | |
| 2004/0072593 A1 | 4/2004 | Robbins et al. | |
| 2004/0097260 A1 | 5/2004 | Stenton et al. | |
| 2004/0165563 A1 | 8/2004 | Hsu et al. | |
| 2004/0176024 A1 | 9/2004 | Hsu et al. | |
| 2005/0070288 A1* | 3/2005 | Belkin et al. | 455/439 |
| 2005/0079873 A1* | 4/2005 | Caspi et al. | 455/456.1 |
| 2005/0085258 A1 | 4/2005 | Ishii et al. | |

(Continued)

FOREIGN PATENT DOCUMENTS

| | | |
|---|---|---|
| WO | 2004004187 | 1/2004 |
| WO | 2004114707 | 12/2004 |
| WO | 2006031159 | 3/2006 |

(Continued)

OTHER PUBLICATIONS

Falo, Luca, Extended European Search Report for EP 06116231.9, Oct. 4, 2006.

(Continued)

*Primary Examiner* — Nathan Mitchell
(74) *Attorney, Agent, or Firm* — Integral Intellectual Property Inc.; Miriam Paton

(57) ABSTRACT

A mobile communication device is able to communicate with wireless local area network and with a cellular network. A communication system is able to route a communication session between the mobile communication device and another communication device either by way of the wireless local area network or the cellular network. The communication system is able to trigger the mobile communication device via the cellular network to search for and attempt to connect to the wireless local area network. The mobile communication device, in response to reception of signaling via the cellular network, is able to activate a wireless local area network interface of the mobile communication device and to establish a connection to the wireless local area network.

7 Claims, 8 Drawing Sheets

U.S. PATENT DOCUMENTS

| | | | |
|---|---|---|---|
| 2005/0181776 A1 | 8/2005 | Verma et al. | |
| 2005/0201357 A1* | 9/2005 | Poyhonen | 370/352 |
| 2006/0040656 A1* | 2/2006 | Kotzin | 455/426.2 |
| 2006/0052113 A1* | 3/2006 | Ophir et al. | 455/456.1 |
| 2006/0089169 A1 | 4/2006 | Tsao et al. | |
| 2006/0217147 A1 | 9/2006 | Olvera-Hernandez et al. | |
| 2008/0248749 A1 | 10/2008 | Bahl et al. | |

OTHER PUBLICATIONS

Lee Sukyoung et al., "Power-Efficient Interace Selection Scheme using Paging of WWAN for WLAN in Heterogeneous Wireless Networks", IEEE ICC 2006 Proceedings.

Mitchell, Nathan A., Final Office Action for U.S. Appl. No. 11/426,977, Apr. 30, 2010.

Mitchell, Nathan A., Final Office Action for U.S. Appl. No. 11/426,977, May 28, 2009.

Mitchell, Nathan A., Fourth office Action for U.S. Appl. No. 11/426,977, Nov. 25, 2009.

Mitchell, Nathan A., Notice of Allowance for U.S. Appl. No. 11/426,977, Jul. 13, 2010.

Stump, Matt, "Getting in Formation for the 'Handoff'", Newswire Multichannel www.multichannel.com Mar. 27, 2006.

* cited by examiner

US 8,379,615 B2

POWER SAVING IN A DEVICE COMPATIBLE WITH CELLULAR AND WLAN NETWORKS

CROSS-REFERENCE TO RELATED APPLICATIONS

This application is a continuation of U.S. patent application Ser. No. 11/426,977 filed Jun. 28, 2006, entitled, "Power Saving in a Device Compatible with Cellular and WLAN Network", which will issue on Nov. 9, 2010 as U.S. Pat. No. 7,830,844, and which is incorporated by reference in its entirety.

BACKGROUND

Members of an enterprise may be provided with mobile stations that are able to communicate via both cellular networks and wireless local area networks (WLAN). While such a device is within the coverage area of an enterprise WLAN (eWLAN) or a public WLAN, a private branch exchange (PBX) of the enterprise may be able to route communication sessions between the mobile device and other communication devices via the eWLAN or the public WLAN, respectively. In addition, while such a device is within the coverage area of a cellular network, the PBX may be able to route communication sessions between the mobile device and other communication devices via the cellular network.

There is a tradeoff between WLAN detection latency and the power consumption required of the mobile station, i.e., the power consumption goes up with the rate at which the WLAN radio is activated to search for WLAN access points (APs). Unfortunately good responsiveness is difficult to obtain without severely impacting the power consumption of the mobile station. This problem is exacerbated by the fact that Institute of Electrical and Electronic Engineers (IEEE) 802.11h has requirements for passive scanning until the mobile station determines its current regulatory jurisdiction. Passive scanning involves leaving the WLAN radio on in receive mode long enough to ensure that any AP beacons will be received with high probability. This is normally a much more power intensive process than using active scanning. The power consumption problem will also worsen as the number of WLAN channels increases, which will happen as handsets are equipped with IEEE 802.11a radios.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

As explained hereinabove, searches for WLANs consume power. Embodiments of the invention address this issue by allowing a mobile station to have its WLAN interface in a lower power state and to be notified if it should attempt to connect to a WLAN. The notification will be sent to the mobile station via a cellular network.

A mobility manager maintains presence information of the mobile station to keep track of whether the mobile station is currently associated with a WLAN. The mobility manager may trigger a mobile station via a cellular network to search for and attempt to connect to a WLAN in order to receive an incoming communication session. The WLAN may be an enterprise WLAN or any other public or private WLAN. A particular mobile station may be able to connect to more than one WLAN at any given time and may prefer connections with an eWLAN. The mobile station, in response to reception of signaling via the cellular network, is able to activate its wireless local area network interface and to establish a connection to a WLAN.

Figure 1:
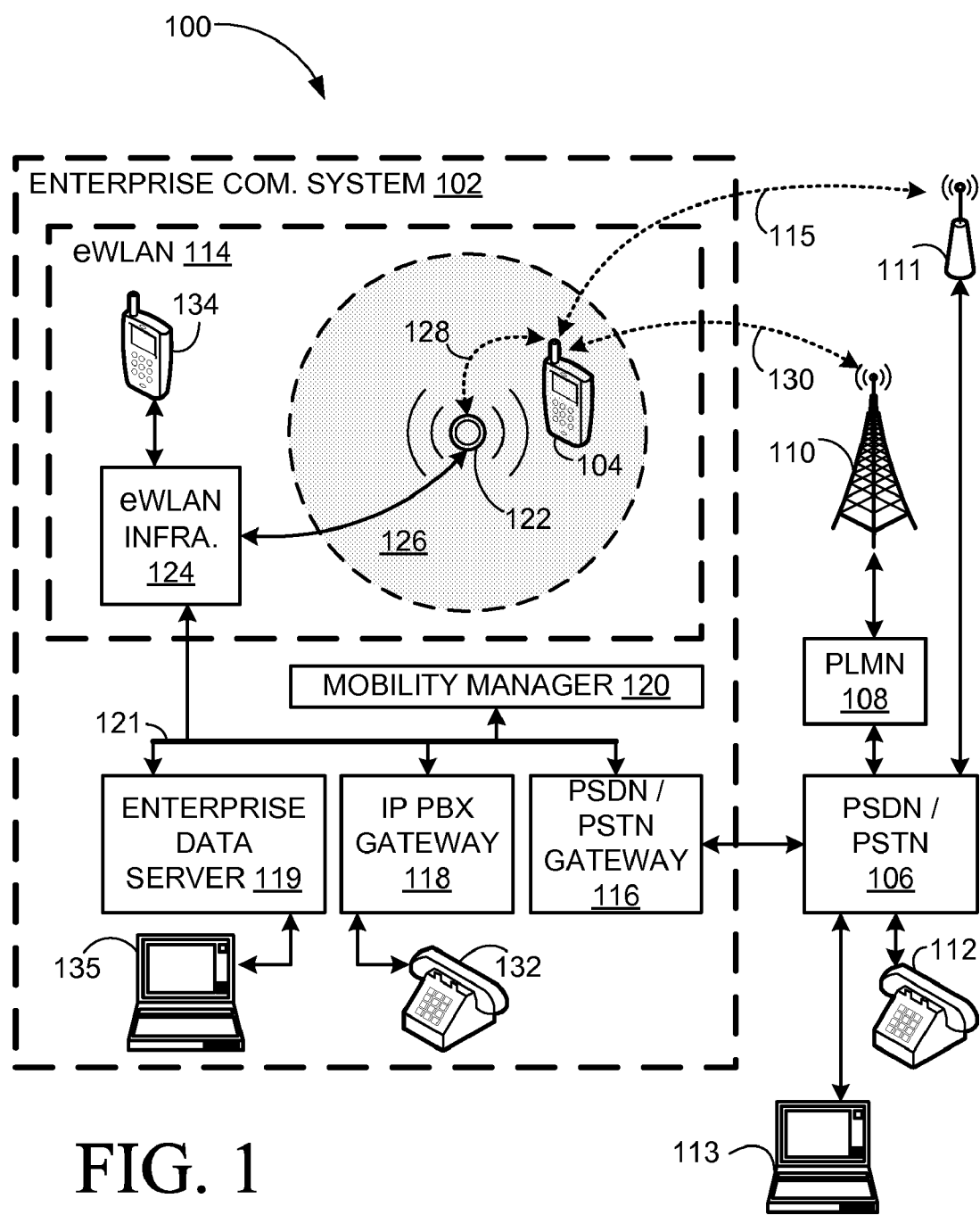
FIG. 1 is an illustration of an exemplary communications system, according to some embodiments of the invention.

FIG. 1 is an illustration of an exemplary communications system 100, according to some embodiments of the invention. Communication system 100 includes an enterprise communication system 102, a mobile station 104, a PSDN (packet switched data network) and/or PSTN (public switching telephone network) 106, a PLMN (public land mobile network) 108 coupled to PSDN/PSTN 106, a PLMN base station 110 coupled to PLMN 108, communication devices 112 and 113 coupled to PSDN/PSTN 106, and a WLAN AP 111 coupled to PSDN 106.

Enterprise communication system 102 includes an eWLAN 114. Enterprise communication system 102 also includes a PSDN/PSTN gateway 116, an IP PBX (Internet protocol private branch exchange) 118, an enterprise data server (EDS) 119, and a mobility manager 120, all of which are connected to an enterprise network 121. PSDN/PSTN gateway 116 couples PSDN/PSTN 106 to enterprise network 121. Mobility manager 120 may be implemented in IP PBX 118 or elsewhere in system 102.

eWLAN 114 includes APs, for example, AP 122, and a wired infrastructure 124. Wired infrastructure 124 is coupled to enterprise network 121. APs of eWLAN 114 may be connected to infrastructure 124 via wired and/or wireless links. eWLAN 114, or parts of eWLAN 114, may be a "mesh" WLAN, in which one or more APs are connected to infrastructure 124 indirectly through other APs. If eWLAN 114 or part of eWLAN 114 is a mesh WLAN, eWLAN 114 may include one or more mesh points. Wired links, mesh points and APs other than AP 122 are not shown in FIG. 1 as not to obscure the description of the embodiments of the invention.

In some embodiments, APs 111 and 122 and mobile station 104 are all compatible with one or more of the IEEE 802.11 standards for WLAN Medium Access Control (MAC) and Physical layer (PHY) specifications, or future related standards.

However, it will be obvious to those of ordinary skill in the art how to modify the following for any other WLAN communications in which a mobile station and an access point can be associated or not associated.

If mobile station 104 is within a coverage area 126 of AP 122 and is wirelessly connected to AP 122, as shown with arrow 128, IP PBX 118 and/or enterprise data server 119 may be able to communicate with mobile station 104 by way of eWLAN infrastructure 124 and AP 122.

Mobile station 104 is able to communicate with AP 111. If mobile station 104 is wirelessly connected to AP 111, as shown with arrow 115, IP PBX 118 and/or enterprise data server 119 may be able to communicate with mobile station 104 by way of PSDN gateway 116, PSDN 106 and AP 111.

Mobile station 104 is able to communicate with PLMN base station 110 using one or more cellular communication standards. If mobile station 104 is wirelessly connected to PLMN base station 110, as shown with arrow 130, IP PBX 118 and/or enterprise data server 119 may be able to communicate with mobile station 104 by way of PSDN/PSTN gateway 116, PSDN/PSTN 106, PLMN 108 and PLMN base station 110.

Mobile station 104 may be configured, permanently or temporarily, to operate in an "enterprise mode". In enterprise mode, communications to and from mobile station 104 are routed to the appropriate entity in system 102, for example, IP PBX 118 for voice communications, mobility manager 120 for signaling and EDS 119 for data communications, which represent a local-to-the-enterprise sink/source for voice, signaling and data communications, respectively. The communication may communicate any suitable information, for example, any or any combination of signaling, voice, video and data.

Consider the following examples, where a caller who uses a device outside of the enterprise places a call to the user of mobile station 104.

In one example, the caller dials the main telephone number of the enterprise, followed by an extension number for the user. Device 112 transmits a communication request to PSDN/PSTN 106 that includes an access code, e.g. the telephone number associated with enterprise communication system 102. PSDN/PSTN 106 routes the communication request to IP PBX 118, where the caller hears a message such as "You have reached Company ABC. If you know the extension of the party you wish to call, please enter it now." The caller dials the extension number, and device 112 sends to IP PBX 118 another access code, e.g. the extension number that is associated with mobile station 104. In response, IP PBX 118 attempts to connect with mobile station 104.

In another example, the caller dials a direct number for the user of mobile station 104. Device 112 transmits a communication request to PSDN/PSTN 106 that includes an access code, e.g. the telephone number that is associated with mobile station 104. PSDN/PSTN 106 routes the communication request to IP PBX 118 and IP PBX 118 attempts to connect with mobile station 104.

Consider also the following examples, where a call takes place entirely inside enterprise communication system 102, using extension numbers assigned by IP PBX 118.

In one example, a wired communication device 132 that is coupled to IP PBX 118 transmits a communication request to IP PBX 118 that includes an access code, e.g. an extension number of mobile station 104, and IP PBX 118 attempts to connect with mobile station 104.

In another example, mobile station 104 transmits a communication request to IP PBX 118 that includes an access code of a wireless communication device 134 that is coupled to eWLAN infrastructure 124. In response, IP PBX 118 attempts to connect with device 134.

Similarly, incoming communication sessions destined for mobile station 104 may originate at an external source such as communication device 113, at a source internal to the enterprise such as a communication device 135, or at a source internal to the eWLAN, such as wireless communication device 134.

While in the enterprise, it may be more cost-effective for mobile station 104 to communicate through eWLAN 114 rather than through PLMN 108. While not in the enterprise, it may be more cost-effective for mobile station 104 to communicate through AP 111 than through PLMN 108. However, as explained above, searching for a WLAN affects the power consumption of mobile station 104.

Mobile station 104 may provide presence signaling to mobility manager 120 so that mobility manager 120 knows whether mobile station 104 is currently associated with an AP in eWLAN 114 or with AP 111.

If an incoming communication session for mobile station 104 arrives at IP PBX 118 and mobility manager 120 knows that mobile station 104 is currently connected to eWLAN 114 or AP 111, then mobility manager 120 can direct IP PBX 118 to establish the communication session with mobile station 104 through eWLAN 114 or AP 111, respectively.

However, if an incoming communication session for mobile station 104 arrives at IP PBX 118 (or enterprise data server 119) and mobility manager 120 knows that mobile station 104 is currently not connected to eWLAN 114 and not to AP 111, then mobility manager 120 can signal mobile station 104 via PLMN 108. In response, mobile station 104 can attempt to connect to eWLAN 114 or AP 111, and if successful, then mobility manager 120 can direct IP PBX 118 (or enterprise data server 119) to establish the communication session with mobile station 104 through eWLAN 114 or AP 111, respectively. In this manner, mobile station 104 can enjoy any cost benefits of using eWLAN 114 or AP 111 for the communication session without having to consume power searching for a WLAN when no incoming or outgoing communication sessions are being handled. In enterprise mode, mobile station 104 may refrain from searching for a WLAN when no incoming or outgoing communication sessions are being handled.

Figure 2:
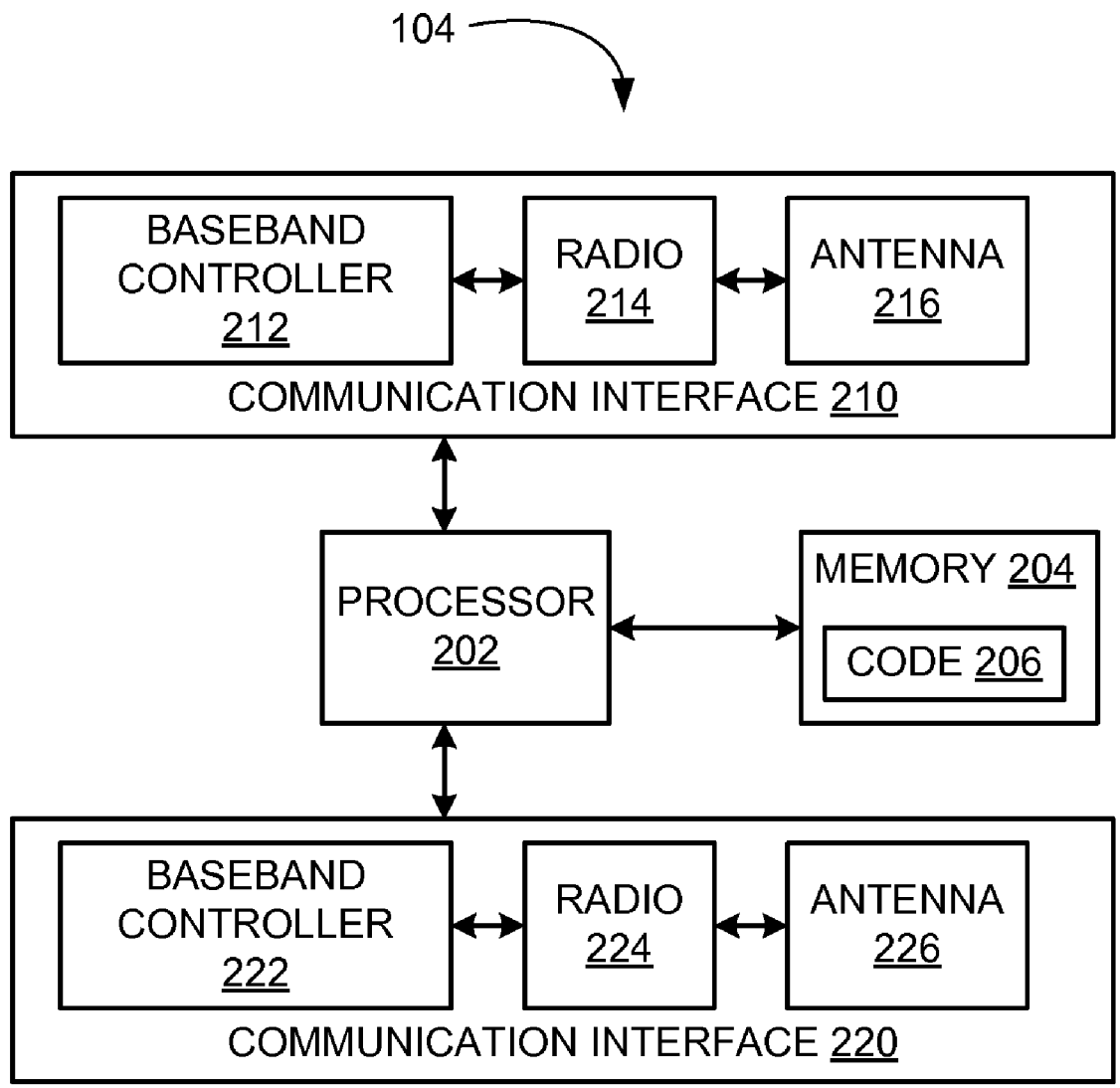
FIG. 2 is a block diagram of an exemplary mobile station, according to some embodiments of the invention.

FIG. 2 is a block diagram of mobile station 104, according to some embodiments of the invention. Mobile station 104 includes a processor 202, and a memory 204 coupled to processor 202. Memory 204 stores code 206 that, when executed by processor 202, may implement the methods described herein.

Mobile station 104 includes a wireless communication interface 210, compatible with one or more standards of the family of IEEE 802.11 wireless communication standards. Wireless communication interface 210 is coupled to processor 202 and includes at least a baseband controller 212, a radio 214, and an antenna 216.

Mobile station 104 includes a wireless communication interface 220, compatible with one or more wireless cellular communication standards. Wireless communication interface 220 is coupled to processor 202 and includes at least a baseband controller 222, a radio 224, and an antenna 226. Mobile station 104 includes other components that are not shown in FIG. 2 for clarity.

A non-exhaustive list of examples for mobile station 104 includes a wireless-enabled laptop, a wireless-enabled cellphone, a wireless-enabled personal digital assistant (PDA), a wireless-enabled smart phone, a wireless-enabled video camera, a wireless-enabled gaming console, a wireless Internet Protocol (IP) phone and any other suitable mobile device.

A non-exhaustive list of examples for standards with which PSDN base station 110 and mobile station 104 may communicate with includes Direct Sequence-Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

Figure 3:
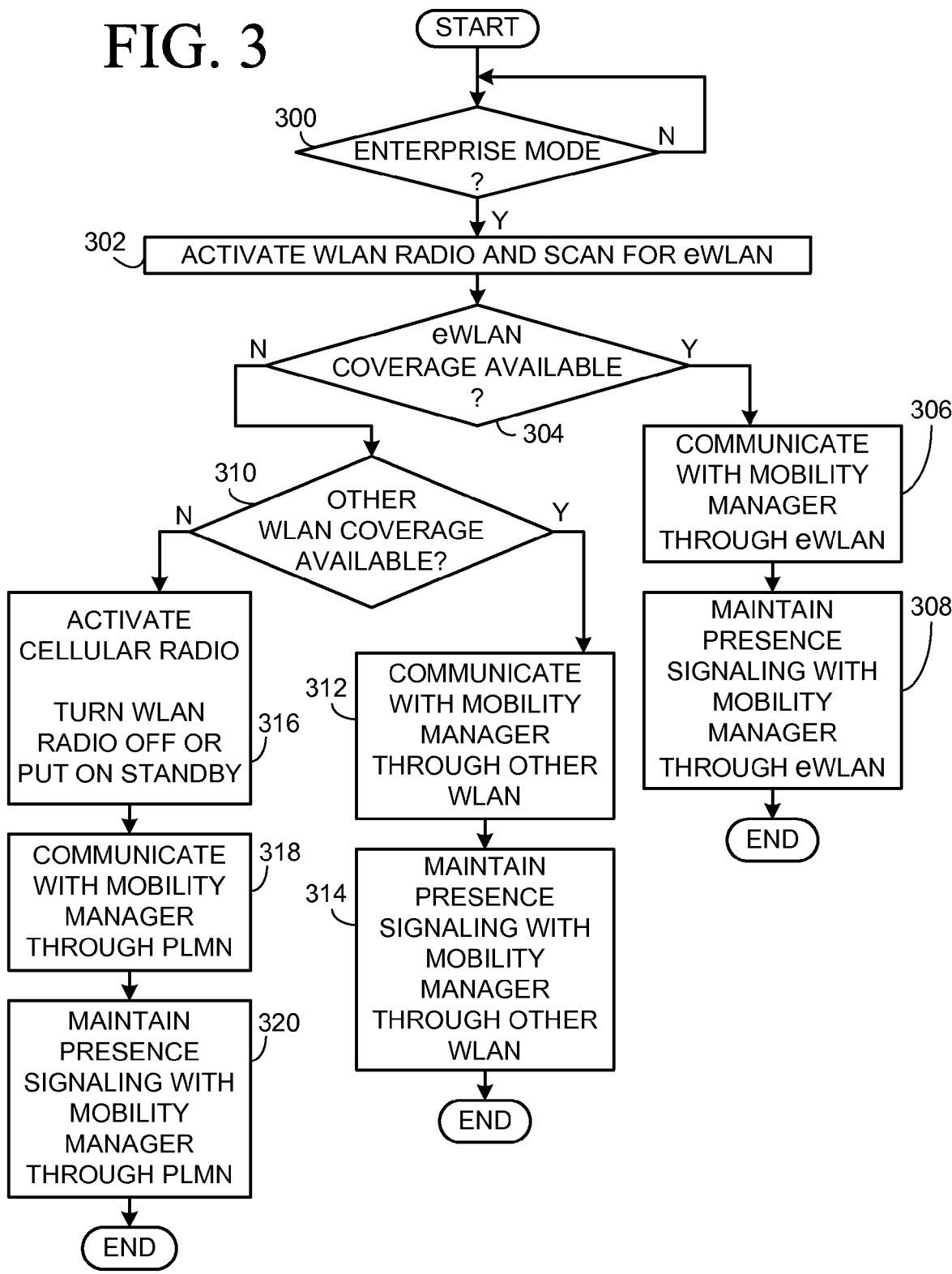
FIG. 3 is a flowchart of an exemplary method for a mobile station to connect to an Internet Protocol public branch exchange (PBX), according to embodiments of the invention.

FIG. 3 is a flowchart of an exemplary method for mobile station 104 to communicate with mobility manager 120, according to embodiments of the invention. As shown at 300, mobile station 104 may execute the method of FIG. 3 as part of the transition into enterprise mode, for example, after mobile station 104 is powered up.

At 302, mobile station 104 activates communication interface 210 and scans for a WLAN. If, as checked at 304, mobile station 104 detects one or more APs of eWLAN 114, for example, AP 122, then mobile station 104 may connect to one of the detected APs and communicate through the detected AP to mobility manager 120, as shown in 306. At 308, mobile station 104 starts maintaining presence signaling with mobility manager 120 via eWLAN 114.

If, as checked at 310, mobile station 104 does not detect any AP of eWLAN 114 but does detect another WLAN, for example AP 111, then mobile station 104 may connect to AP 111 and communicate through AP 111 to mobility manager 120, as shown in 312. At 314, mobile station 104 starts maintaining presence signaling with mobility manager 120 via AP 111.

If mobile station 104 does not detect any AP then at 316, mobile station 104 turns off or puts on "standby" wireless communication interface 210 or portions thereof, where standby is a low-power mode in which the mobile station is not associated with any access point. At 316, mobile station 104 also activates wireless communication interface 220. At 318, mobile station 104 communicates with mobility manager 120 via PLMN 108. At 320, mobile station 104 starts maintaining presence signaling with mobility manager 120 via PLMN 108.

The presence signaling between mobile station 104 and mobility manager 120 continues in the background through the available connection (whether through eWLAN 114, AP 111 or the cellular network PLMN 108).

Figure 4:
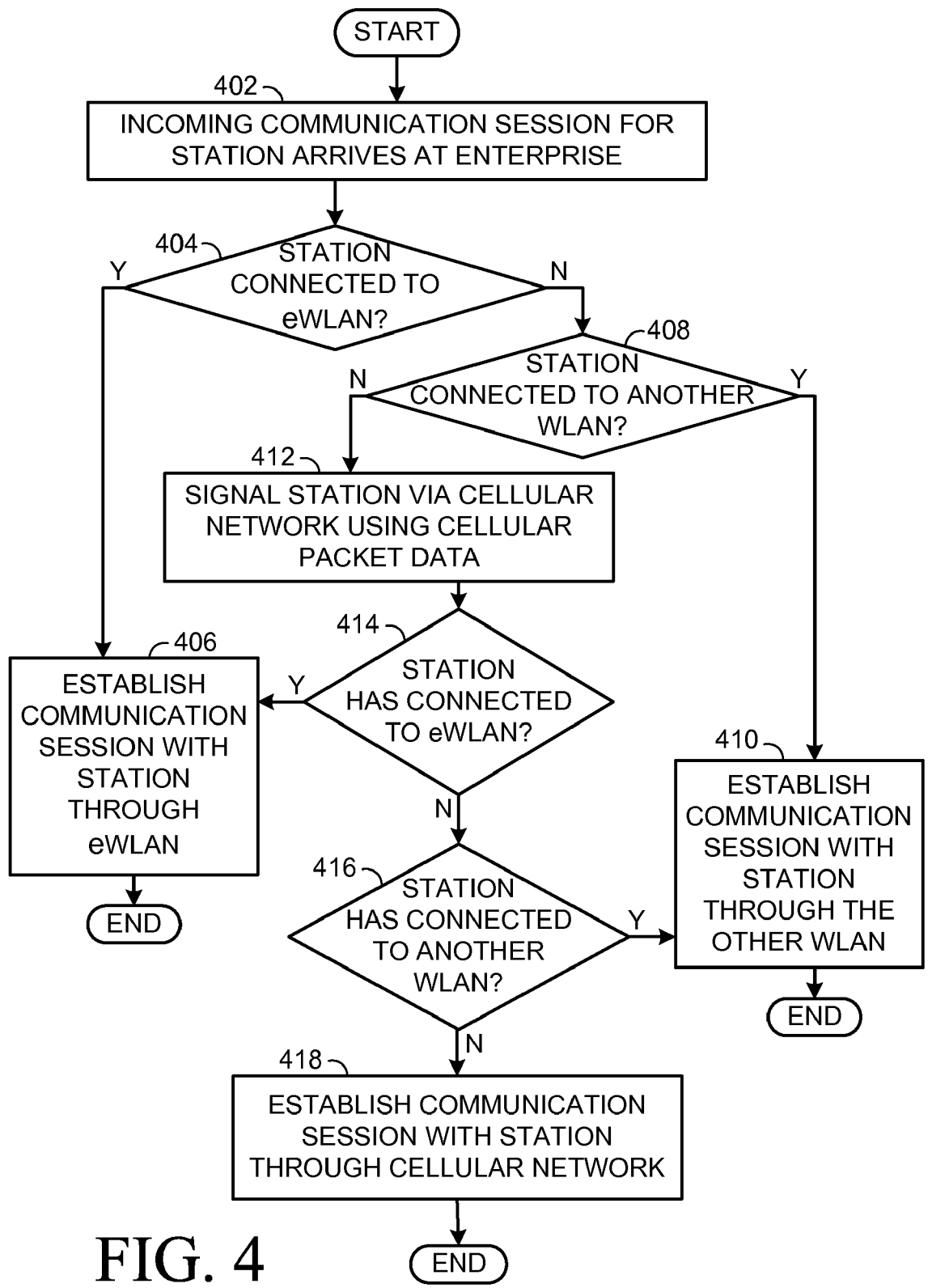
FIG. 4 is a flowchart of an exemplary method in a mobility manager for establishing a communication session with a mobile station, according to embodiments of the invention.

FIG. 4 is a flowchart of an exemplary method in mobility manager 120 for establishing a communication session with mobile station 104, according to embodiments of the invention. At 402, mobility manager 120 receives signaling from IP PBX 118, the meaning of which is that a communication device, for example, one of devices 112, 132 or 134, is trying to establish a communication session with station 104. Alternatively, the mobility manager 120 receives signaling from enterprise data server 119, the meaning of which is that a communication device, for example, one of devices 113, 134 or 135, is trying to establish a communication session with station 104. At 404, mobility manager 120 checks whether station 104 is connected to eWLAN 114, for example via AP 122.

If station 104 is connected to eWLAN 114, then at 406, mobility manager 120 establishes the communication session with station 104 via eWLAN 114. For example, mobility manager 120 signals IP PBX 118 (or enterprise data server 119) to route the incoming communication session to station 104 via eWLAN 114. If station 104 is not connected to eWLAN 114, then at 408, mobility manager 120 checks whether station 104 is connected to another WLAN, for example via AP 111. If station 104 is connected to another WLAN, then at 410, mobility manager 120 establishes the communication session with station 104 via the other WLAN.

If station 104 is not connected to eWLAN 114 or AP 111, then at 412, mobility manager 120 attempts to inform mobile station 104 about the incoming communication session via PLMN 106, for example, by sending one or more GPRS (general packet radio service) packets to mobile station 104.

If at 414 mobility manager 120 receives signaling from mobile station 104 that indicates that mobile station 104 has connected to eWLAN 114, the method continues to 406. Otherwise, if at 416 mobility manager 120 receives signaling from mobile station 104 that indicates that mobile station 104 has connected to AP 111, the method continues to 410.

If at 418, mobility manager 120 does not receive signaling from mobile station 104 that indicates that mobile station 104 has connected to AP 111, mobility manager 120 establishes the communication session with station 104 via PLMN 108. For example, mobility manager 120 signals IP PBX 118 (or enterprise data server 119) to route the incoming communication session to station 104 via PLMN 108.

Figure 5:
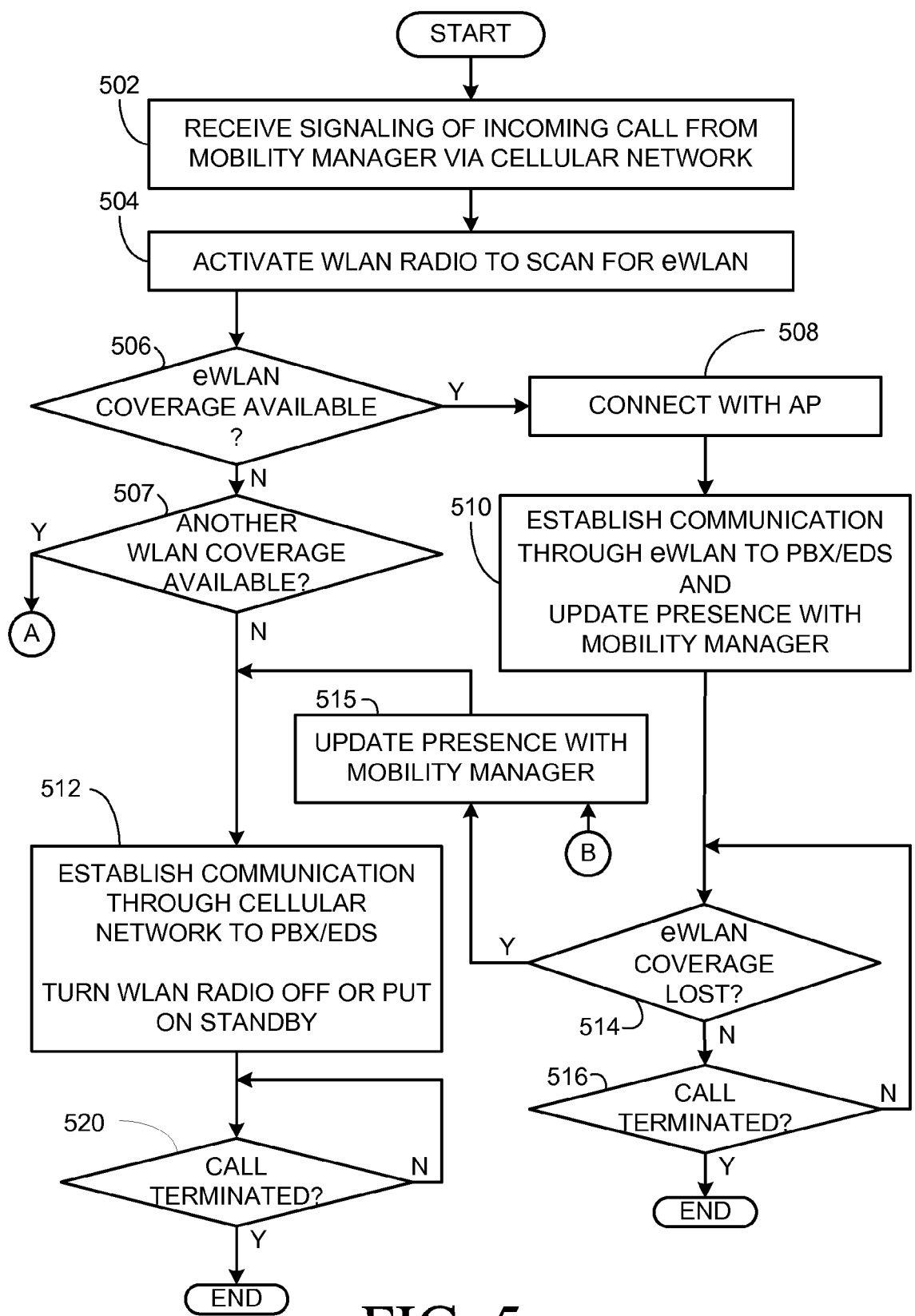
FIGS. 5 and 6 are a flowchart of an exemplary method in a mobile station for handling an incoming communication session, according to embodiments of the invention.
Figure 6:
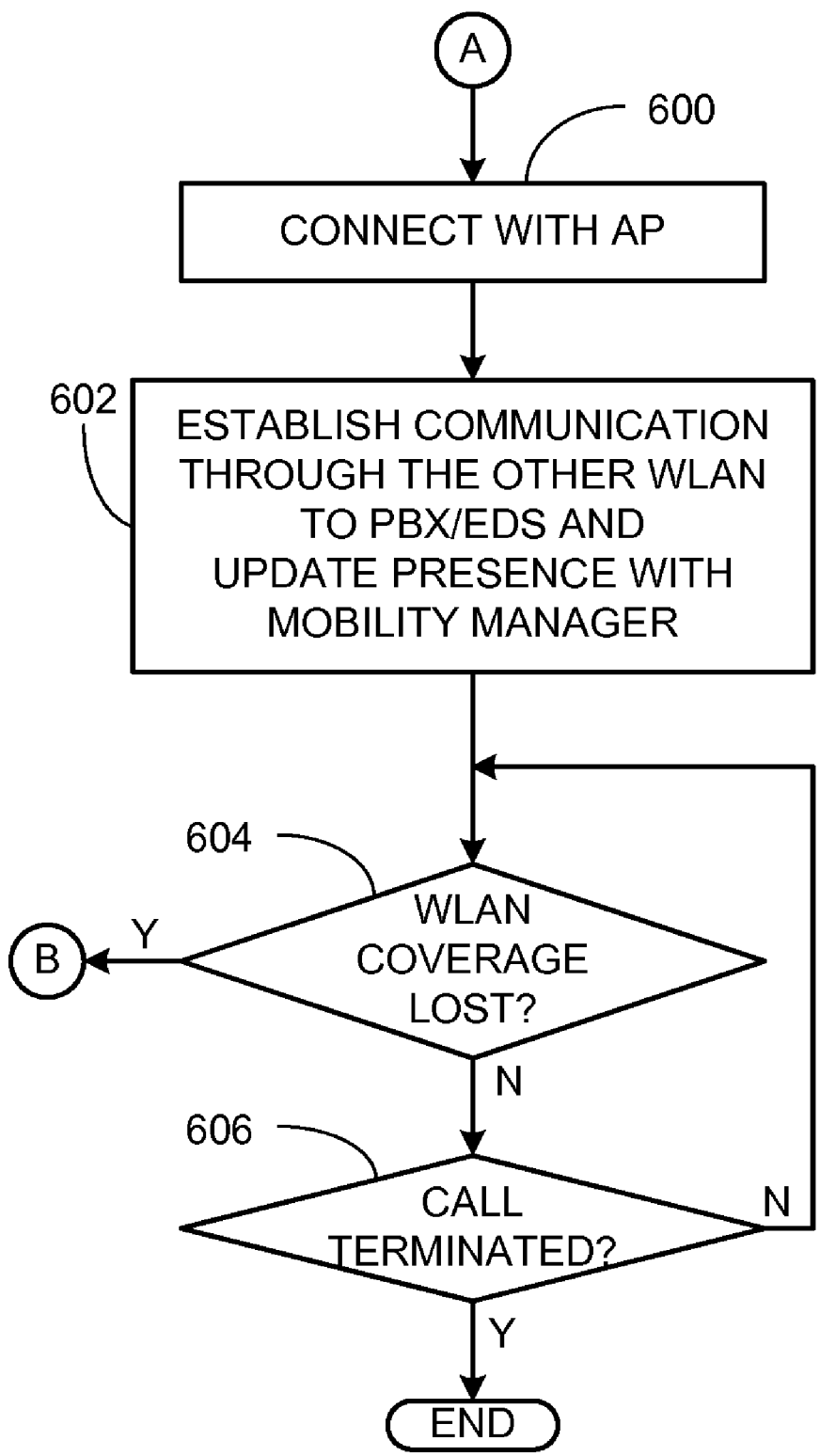

FIGS. 5 and 6 are a flowchart of an exemplary method in mobile station 104 for handling an incoming communication session that arrives when the mobile station 104 is not connected to eWLAN 114, according to embodiments of the invention. The method of FIGS. 5 and 6 may be executed by mobile station 104 from a state in which station 104 is connected to PLMN 108 and maintaining presence signaling with mobility manager 120 by way of PLMN 108.

At 502, station 104 receives from IP PBX 118 signaling about an incoming communication session, for example, signaling sent by mobility manager 120 via IP PBX 118 at 408 of the method of FIG. 4. In response, at 504, station 104 activates communication interface 220 to scan for a WLAN.

If at 506 station 104 finds one or more APs of eWLAN 114, then at 508, station 104 connects to one of the found APs, for example, AP 122. At 510, station 104 establishes the communication session through AP 122, infrastructure 124 and IP PBX gateway 118 or enterprise data server 119, and updates mobility manager 120 to indicate that it is currently connected to eWLAN 114.

If at 506 station 104 does not find any AP of eWLAN 114, then at 507, station 104 searches for other WLANs. If at 507 station 104 does not find any other WLAN, then at 512, station 104 establishes the communication session through PLMN 106 and turns off or puts on standby wireless communication interface 210 or portions thereof. It should be understood that the order described herein for station 104 to search for a network to connect to is merely an example and that any other order may be used.

If station 104 loses connectivity with eWLAN 114 while handling the communication session via eWLAN 114, as shown at 514, the method continues to 515 where station 104 updates its presence information with mobility manager 120, and then to 512. If the communication session is ended without loss of connectivity, as shown in 516, the method terminates.

If the communication session that is maintained by station 104 via PLMN 108 is terminated, as shown at 520, then the method terminates.

If at 507, station 104 does find another WLAN, for example AP 111, the method continues to 600 of FIG. 6. At 600, station 104 connects to AP 111. At 602, station 104 establishes the communication session through AP 111, PSDN 106, PSDN gateway 116, infrastructure 124 and IP PBX gateway 118 or enterprise data server 119, and updates mobility manager 120 to indicate that it is currently connected to the other WLAN.

If station 104 loses connectivity with AP 111 while handling the communication session via AP 111, as shown at 604, the method continues to 515 of FIG. 5 where station 104 updates its presence information with mobility manager 120, and then to 512. If the communication session is ended without loss of connectivity, as shown in 520, the method terminates.

If the communication session that is maintained by station 104 via AP 111 is terminated, as shown at 606, then the method terminates.

Figure 7:
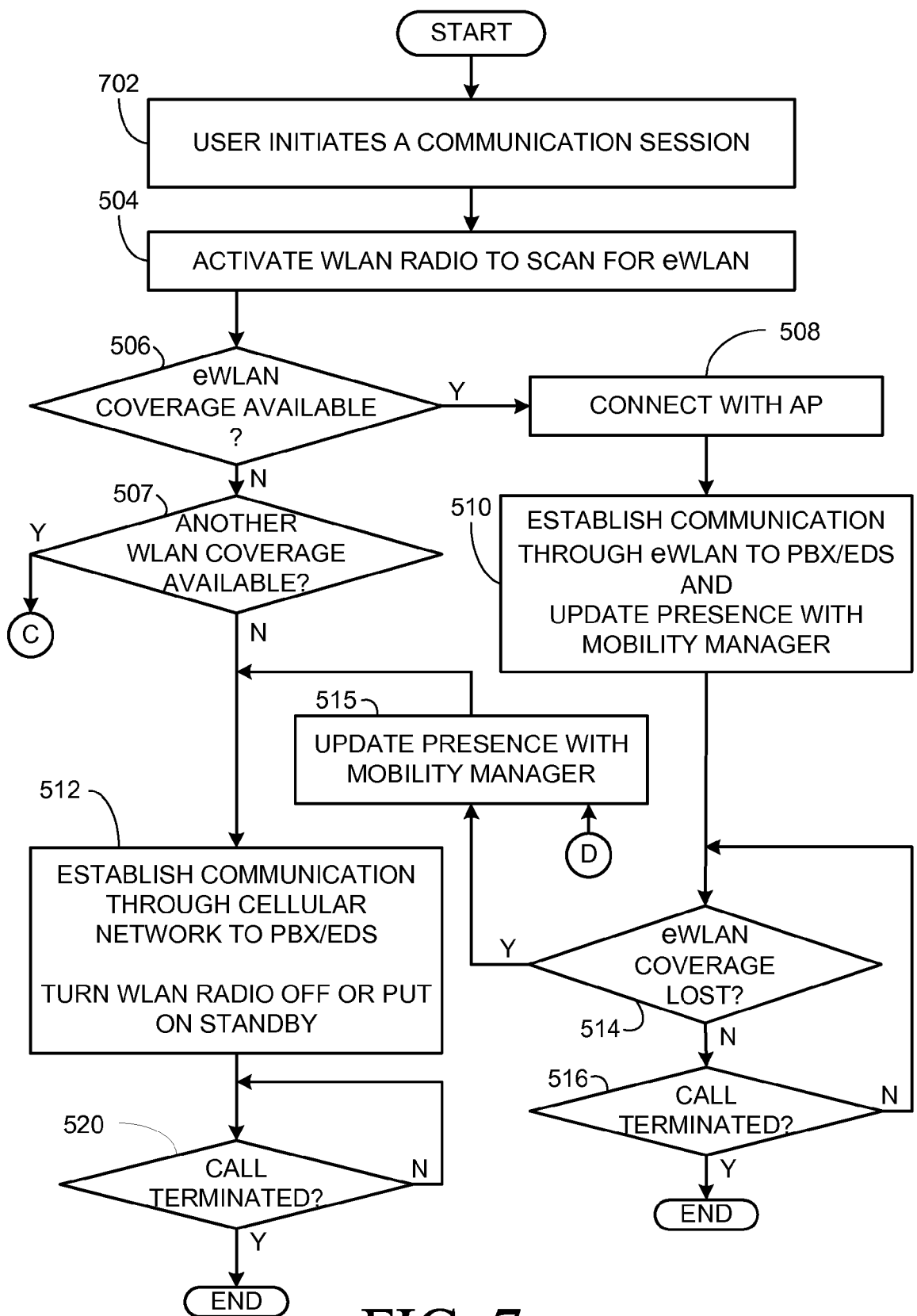
FIGS. 7 and 8 are a flowchart of an exemplary method in a mobile station for handling an outgoing communication session, according to embodiments of the invention.
Figure 8:
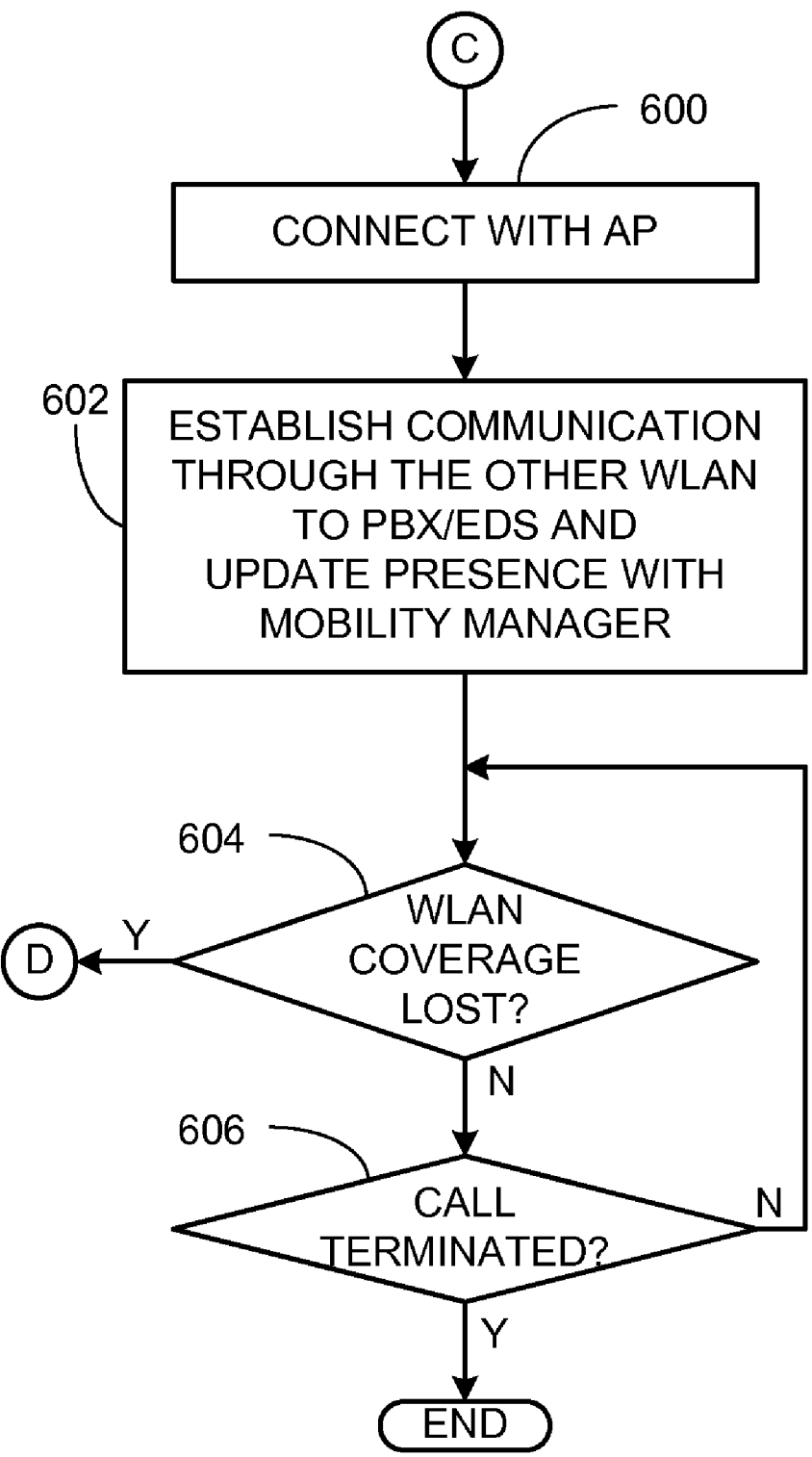

FIGS. 7 and 8 are a flowchart of an exemplary method in mobile station 104 for handling an outgoing communication session, according to embodiments of the invention. The method of FIGS. 7 and 8 may be executed by mobile station 104 from a state in which station 104 maintains presence signaling with mobility manager 120 by way of PLMN 108.

At 702, station 104 recognizes that a user of station 104 is initiating a communication session to another communication device. The method then continues from 504 as in the method of FIG. 5.

Computer-executable instructions for managing communications such as in the above-described methods may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by Internet or other computer network forms of access.

Although the subject matter has been described in respect to an enterprise communication system and its co-operation with other networks, this is merely an example. Embodiments of the invention are applicable in any other system where two or more communication links can be used to communicate with a mobile device. For example, mobile device may be able to communicate with PLMN base station 110 and with AP 111 but may not be configured to communicate with eWLAN 114. In this example, simplified versions of the methods described in FIG. 3-8 may be used with respect to base station 110 and AP 111. In addition, a simplified version of the method described in FIG. 4 may be implemented in one or more servers (not shown) coupled to PLMN 108 and/or PSDN/PSTN 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a mobile communication device, the method comprising:

transmitting presence signaling to a mobility manager via a cellular network;

in response to recognizing that a user of said device is initiating a communication session to another communication device, activating a wireless local area network interface of said mobile communication device and searching for and attempting to establish a connection to a wireless local area network; and in response to determining that a connection to a particular wireless local area network is established, transmitting updated presence signaling to said mobility manager via said particular wireless local area network.

2. The method of claim 1, further comprising:

establishing said communication session with said other communication device via said particular wireless local area network.

3. The method of claim 1, further comprising:

in response to determining that said connection is lost, transmitting updated presence signaling to said mobility manager via said cellular network, establishing said communication session with said other communication device via said cellular network.

4. A non-transitory computer-readable medium having computer-executable instructions which when executed by a computer in a mobile communication device result in:

transmitting presence signaling to a mobility manager via a cellular network;

in response to recognizing that a user of said device is initiating a communication session to another communication device, activating a wireless local area network interface of said mobile communication device and searching for and attempting to establish a connection to a wireless local area network; and in response to determining that a connection to a particular wireless local area network is established, transmitting updated presence signaling to said mobility manager via said particular wireless local area network.

5. A mobile communication device comprising:

a processor;

a cellular communication interface coupled to said processor;

a wireless local area network interface coupled to said processor; and a memory configured to store code which, when executed by said processor, causes said mobile communication device to transmit presence signaling to a mobility manager via a cellular network using said cellular communication interface and in response to recognizing that a user of said device is initiating a communication session to another communication device, to activate said wireless local area network interface and to search for and attempt to establish a connection to a wireless local area network, and in response to determining that a connection to a particular wireless local area network is established via said wireless local area network interface, to transmit updated presence signaling to said mobility manager via said particular wireless local area network.

6. The mobile communication device of claim 5, wherein said code, when executed by said processor, further causes said mobile communication device to establish said communication session with said other communication device via said particular wireless local area network.

7. The mobile communication device of claim 5, wherein said code, when executed by said processor, further causes said mobile communication device, in response to determining that said connection is lost, to transmit updated presence signaling to said mobility manager via said cellular network, to establish said communication session with said other communication device via said cellular network.

* * * * *